(12) United States Patent
Dodd-Noble et al.

(10) Patent No.: US 11,743,230 B2
(45) Date of Patent: Aug. 29, 2023

(54) NETWORK ADDRESS TRANSLATION (NAT) TRAVERSAL AND PROXY BETWEEN USER PLANE FUNCTION (UPF) AND SESSION MANAGEMENT FUNCTION (SMF)

(71) Applicant: Cisco Technology, Inc., San Jose, CA (US)

(72) Inventors: Aeneas Sean Dodd-Noble, Andover, MA (US); Irfan Ali, Palo Alto, CA (US); Ravi Kiran Guntupalli, Cumming, GA (US); Ravi Shekhar, Maharastra (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/733,489

(22) Filed: Apr. 29, 2022

(65) Prior Publication Data

US 2022/0263792 A1 Aug. 18, 2022

Related U.S. Application Data

(63) Continuation of application No. 17/079,836, filed on Oct. 26, 2020, now Pat. No. 11,374,900.

(51) Int. Cl.
  *H04L 61/256* (2022.01)
(52) U.S. Cl.
  CPC .................................. *H04L 61/256* (2013.01)
(58) Field of Classification Search
  CPC ....................... H04L 61/256; H04L 67/14–142
  See application file for complete search history.

(56) References Cited

U.S. PATENT DOCUMENTS 11,129,215 B2 * 9/2021 Bharatia ................. H04L 67/56
11,201,762 B2 * 12/2021 Yu ........................... H04L 49/25
(Continued)

FOREIGN PATENT DOCUMENTS

WO   2019193129 A1   10/2019
WO   2020146619 A1   7/2020

OTHER PUBLICATIONS

Developing Solutions, Inc., "dsTest® Help", https://www.developingsolutions.com/Help_2.9/Index.htm?context=25890, downloaded Aug. 3, 2020, 1 page.

(Continued)

*Primary Examiner* — Jerry B Dennison
(74) *Attorney, Agent, or Firm* — Edell, Shapiro & Finnan, LLC

(57) ABSTRACT

A method enables communication between Session Management Function (SMF) and User Plane Function (UPF) instances which are separately deployed behind Network Address Translation (NAT) services. The method includes configuring an SMF or a UPF to initiate an association with a corresponding UPF or SMF. The SMF registers first information with a Network Repository Function (NRF) enabling the remote UPF to communicate with the SMF through a NAT service. The method further includes obtaining second information from the NRF enabling the SMF to communicate with the remote UPF through the NAT service. The method also includes sending an association request to the remote UPF based on the second information and receiving an association response from the remote UPF through the NAT service.

20 Claims, 10 Drawing Sheets

(56) References Cited

U.S. PATENT DOCUMENTS

| | | | |
|---|---|---|---|
| 2011/0264909 A1 | 10/2011 | Ejzak | |
| 2012/0113966 A1* | 5/2012 | Tao | H04L 12/12 370/338 |
| 2013/0188560 A1 | 7/2013 | Kiss et al. | |
| 2017/0026412 A1 | 1/2017 | Stojanovsk et al. | |
| 2019/0150225 A1* | 5/2019 | Mohamed | H04W 8/22 370/329 |
| 2019/0158408 A1* | 5/2019 | Li | H04L 12/189 |
| 2019/0158985 A1* | 5/2019 | Dao | H04L 63/0428 |
| 2019/0215724 A1 | 7/2019 | Talebi Fard et al. | |
| 2020/0073054 A1* | 3/2020 | Yang | G02B 6/3558 |
| 2020/0146077 A1* | 5/2020 | Li | H04W 76/10 |
| 2020/0245381 A1 | 7/2020 | Talebi Fard et al. | |
| 2020/0351985 A1* | 11/2020 | Zhu | H04W 76/11 |
| 2020/0359439 A1* | 11/2020 | Qiao | H04W 76/12 |
| 2021/0044628 A1* | 2/2021 | Foti | H04L 67/52 |
| 2021/0051070 A1* | 2/2021 | Akman | H04L 41/5019 |
| 2021/0058366 A1* | 2/2021 | Mas Rosique | H04L 12/1407 |
| 2021/0068045 A1* | 3/2021 | Regnault | H04L 43/10 |
| 2021/0068172 A1* | 3/2021 | Jeong | H04W 24/02 |
| 2021/0075761 A1* | 3/2021 | Li | H04L 61/103 |
| 2021/0092588 A1* | 3/2021 | Xin | H04W 24/08 |
| 2021/0112001 A1* | 4/2021 | Li | H04W 76/12 |
| 2021/0117360 A1* | 4/2021 | Kutch | G06F 3/061 |
| 2021/0120484 A1* | 4/2021 | Thorat | H04W 8/08 |
| 2021/0122261 A1* | 4/2021 | Qiao | B60L 53/68 |
| 2021/0144630 A1* | 5/2021 | Wang | H04W 76/15 |
| 2021/0184875 A1* | 6/2021 | Qiao | H04W 76/11 |
| 2021/0226902 A1* | 7/2021 | Li | H04L 41/0806 |
| 2021/0243826 A1* | 8/2021 | Hoffmann | H04W 68/005 |
| 2021/0274418 A1* | 9/2021 | Zhou | H04W 80/02 |
| 2021/0385642 A1* | 12/2021 | Di Girolamo | H04W 8/18 |
| 2022/0046742 A1* | 2/2022 | Lin | H04W 76/10 |
| 2022/0116822 A1* | 4/2022 | Sahin | H04L 45/24 |
| 2022/0124548 A1* | 4/2022 | Srivastava | H04W 40/248 |
| 2022/0131830 A1* | 4/2022 | Dodd-Noble | H04L 61/256 |
| 2022/0232046 A1* | 7/2022 | Agarwal | H04L 65/1016 |
| 2022/0263792 A1* | 8/2022 | Dodd-Noble | H04L 61/2585 |
| 2022/0377043 A1* | 11/2022 | Yang | H04M 15/66 |
| 2023/0038228 A1* | 2/2023 | Chen | H04L 67/1004 |
| 2023/0094746 A1* | 3/2023 | Jeong | H04W 76/10 370/330 |
| 2023/0101909 A1* | 3/2023 | Iqbal | H04L 41/0893 718/1 |

OTHER PUBLICATIONS

Abrahim, "Multiple NAT ALGs", Huawei Technologies Co., Ltd., https://support.huawei.com/huaweiconnect/carrier/en/forum.php?mod=viewthread&tid=68427&page=1&authorid=27851, downloaded Aug. 3, 2020, 2 pages.

Juniper Networks, Inc., "NAT for GTP", https://www.juniper.net/documentation/en_US/junos/topics/topic-map/security-gprs-nat-gtp.html, Oct. 14, 2019, 9 pages.

3GPP, "3rd Generation Partnership Project; Technical Specification Group Core Network and Terminals; Interface between the Control Plane and the User Plane Nodes; Stage 3 (Release 16)", 3GPP TS 29.244 V16.4.0, Jun. 2020, 310 pages.

Developing Solutions, "NF Interface," The Wayback Machine—https://web.archive.org/web/20210122035311/https://www.developingsolutions.com/products/dstest-5g-core-network-testing/n4-interface/ (Year: 2021).

\* cited by examiner

NETWORK ADDRESS TRANSLATION (NAT) TRAVERSAL AND PROXY BETWEEN USER PLANE FUNCTION (UPF) AND SESSION MANAGEMENT FUNCTION (SMF)

CROSS-REFERENCE TO RELATED APPLICATIONS

This application is a continuation of U.S. application Ser. No. 17/079,836, filed Oct. 26, 2020, the entirety of which are hereby incorporated by reference herein.

TECHNICAL FIELD

The present disclosure relates to mobile networks, particularly networks that separate control plane and user plane functions.

BACKGROUND

When a Session Management Function (SMF) or a User Plane Function (UPF) is deployed in the cloud or behind a Network Address Translation (NAT) firewall, the N4 interface may not be able to successfully bridge the control plane and the user plane. The N4 interface is based on Internet Protocol (IP) addresses and well known ports, and not Universal Resource indicators (URIs). The Fully-qualified Session Endpoint Identifier (F-SEID) also uses the IP address of the N4 interface as an identifier and may not match the IP address of the message. Furthermore, the General Packet Radio Service (GPRS) Tunneling Protocol for User data (GTP-U) tunnel that is associated with the Packet Forwarding Control Protocol (PFCP) session uses the same IP addresses as the N4 interface.

DESCRIPTION OF EXAMPLE EMBODIMENTS

Overview

The techniques described herein provide for a computer implemented method for communicating between SMF and UPF instances which are separately deployed behind NAT firewalls or other NAT-based devices or services. In one embodiment, the method includes configuring at least one SMF to initiate an association with at least one remote UPF. The method also includes registering first information with an NRF enabling the at least one remote UPF to communicate with the at least one SMF through at least one NAT service. The method further includes obtaining second information from the NRF enabling the at least one SMF to communicate with the at least one remote UPF through the at least one NAT service. The method also includes sending an association request to a selected remote UPF among the at least one remote UPF based on the second information and receiving an association response from the selected remote UPF.

Example Embodiments

The ability to have an SMF or the entire control plane of a 5G system in the cloud and a UPF on premise or edge with one or more NATs between them may be valuable in both Multi-access Edge Computing (MEC) and enterprise 5G/4G networks. In public cloud deployments (e.g., Amazon™ Web Services (AWS)), functions such as Internet Gateway and Local Gateway may perform NAT between the Elastic Compute Cloud (EC2) instance and the Internet. In preparation to deploy 5GaaS, the ability to traverse NAT may be beneficial. The techniques described herein provide three novel techniques for NAT transversal, which are more efficient and less cumbersome than conventional NAT traversal techniques.

Hereinafter, the techniques for NAT traversal will generally be described within the framework of a 5G system, but similar techniques may be applied to 4G system that separate control plane function from user plane functions. The Serving Gateway (SGW) and Packet data network Gateway (PGW) may be separated such that an SGW-Control (SGW-C) and PGW-Control (PGW-C) functions perform control plane functions corresponding to the SMF function in a 5G system, and an SGW-User (SGW-U) and PGW-User (PGW-U) perform user plane functions corresponding to the UPF function in a 5G system.

Figure 1:
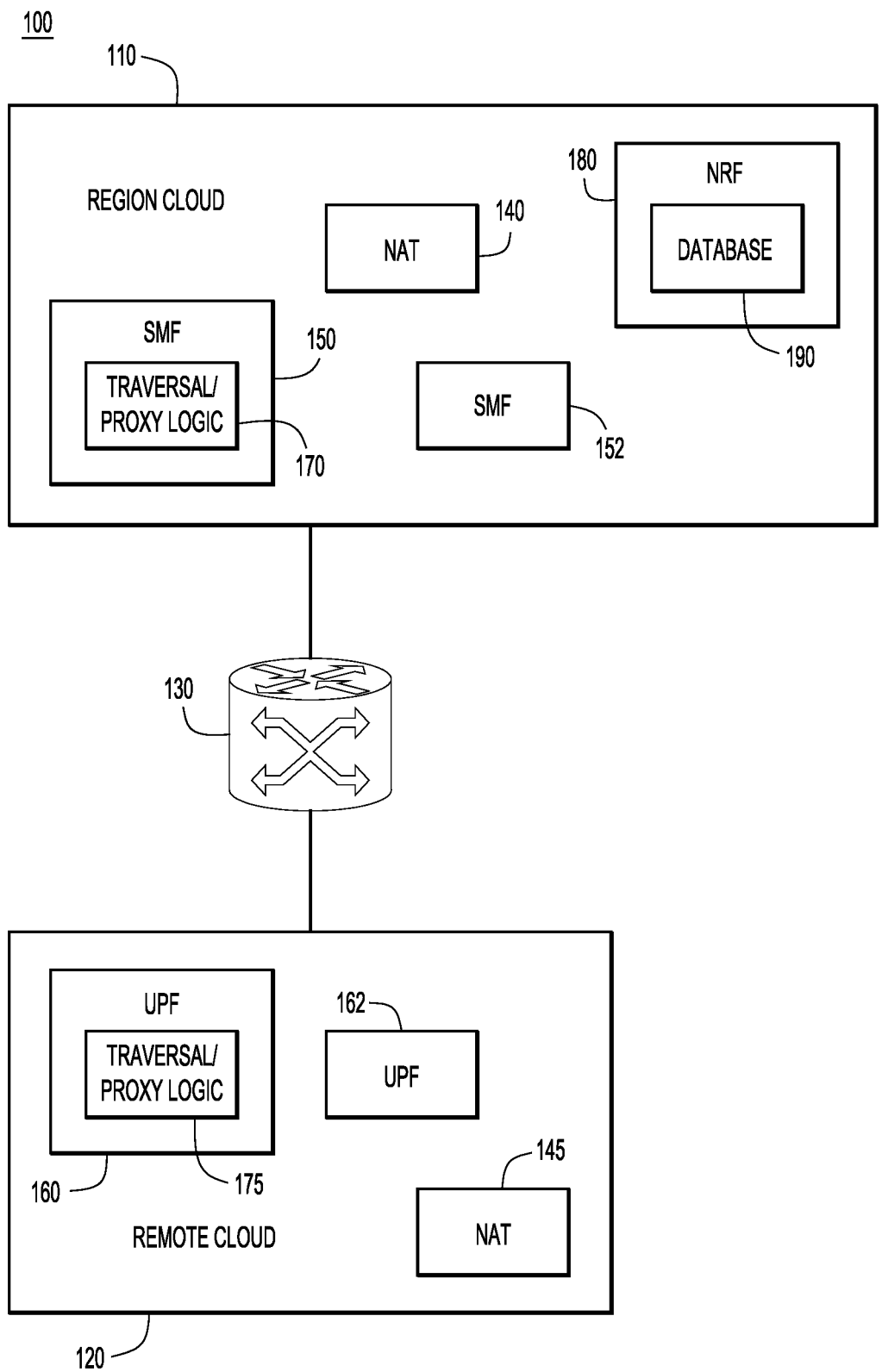
FIG. 1 is a simplified block diagram of a 5G network, according to an example embodiment.

Referring now to FIG. 1, a 5G system 100 configured to traverse NAT services between the SMF instances and UPF instances is shown. The system includes some 5G functions in a region cloud 110 and other 5G functions in a remote cloud 120 (e.g., an enterprise cloud), connected by a network 130. The region cloud 110 includes a NAT service 140 that may apply to any or all of the function in the region cloud 110. Similarly, the remote cloud 120 includes a NAT service 145 that may apply to any or all of the functions in the remote cloud 120.

The region cloud 110 includes an SMF 150 and an SMF 152 that are configured to manage sessions for devices accessing the system 100 through an Access Management Function (AMF) not shown in FIG. 1. In one example, the region cloud 110 may include additional SMFs that are not pictured in FIG. 1. The remote cloud 120 includes a UPF 160 and a UPF 162, both of which are configured to connect to an external data network. The SMFs 150 and 152 and the UPFs 160 and 162 coordinate the user data plane sessions for devices connected to the 5G system 100. When an SMF (e.g., SMF 150 or SMF 152) communicates with a UPF (e.g., (UPF 160 or UPF 162) through the network 130, the data passes through the NAT service 140 and/or the NAT service 145, which may obscure the network address (e.g., IP address) to reach the functions on the opposite side of the network 130.

To traverse the NAT services 140 and 145, the SMF 150 includes NAT Traversal/Proxy Logic 170 and the UPF 160 includes similar Traversal/Proxy Logic 175. The SMF 152 and UPF 162 also include similar logic to traverse the NAT service 140 and/or 145 as described in more detail hereinafter.

The region cloud 110 also includes an NRF 180 with a database 190 that stores information about the functions in the 5G system 100, such as the SMFs 150 and 152 and the UPFs 160 and 162. The NRF 180 may store information usable by the Traversal/Proxy Logic 170 or 175 to traverse the NAT service 140 or 145.

Three example methods are described hereinafter for NAT traversal between SMF and UPF deployments. In one method, as described with respect to FIG. 2, FIG. 3, and FIG. 7, the Fully Qualified Domain Name (FQDN) is introduced into the F-SEID and traverses multiple static 1:1 NAT firewalls. In another method, as described with respect to FIG. 4 and FIG. 8, non-standard ports are used for PFCP and GTP-U messages between SMF and UPF instances. In a further method, as described with respect to FIG. 5 and FIG. 9, an Application Level Gateway (ALG) augments the NAT and allows the SMF deployment to proxy functions from the UPF deployment and the UPF deployment to proxy functions from the SMF deployment. Each of the methods is described herein with the SMF initiating the association with the UPF through the NAT service. However, in other examples, the UPF may initiate the association with SMF through the NAT service.

Method-1: FQDN Introduced in F-SEID and Using Multiple Static 1:1 NAT

Figure 2:
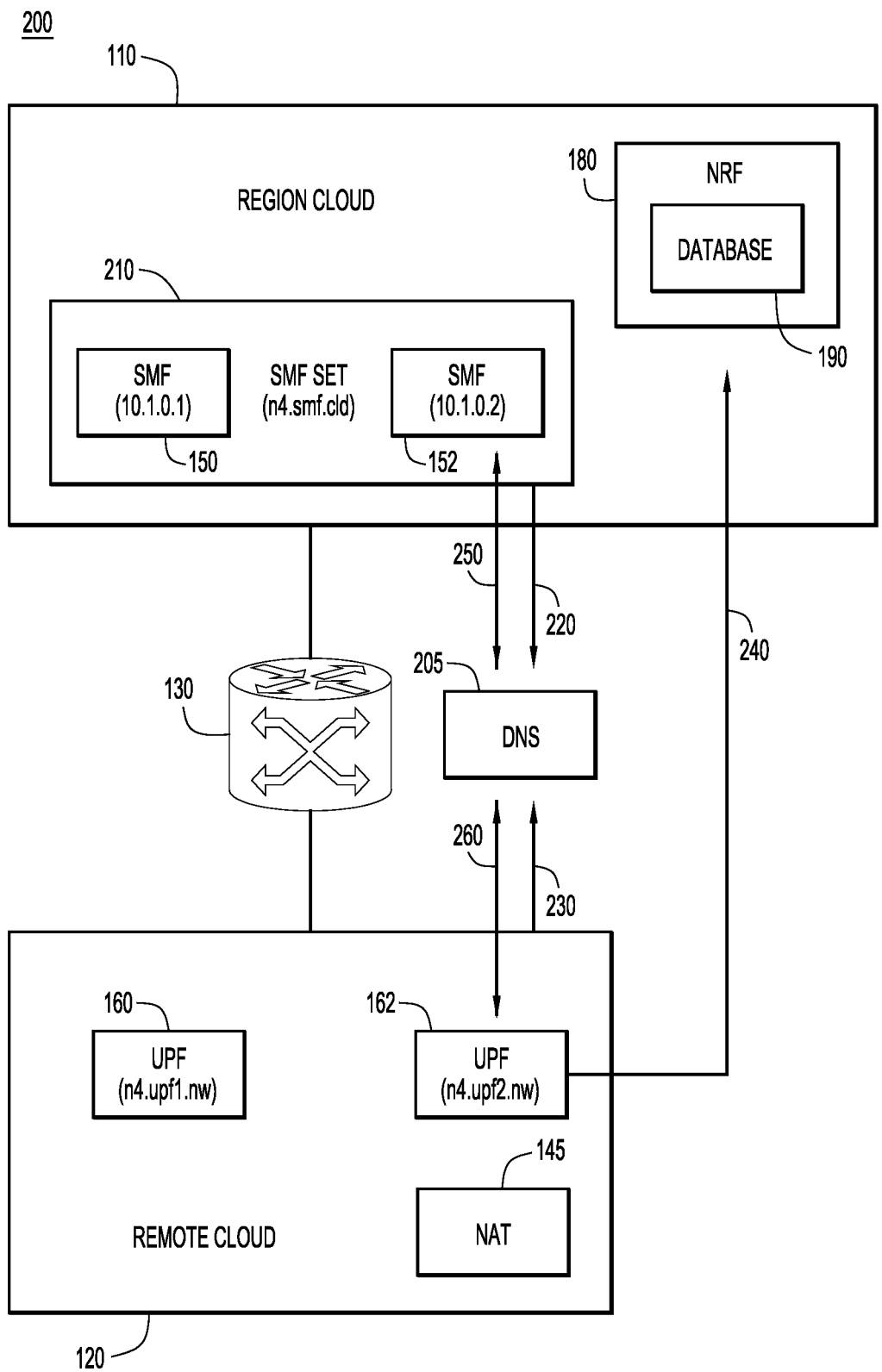
FIG. 2 is a simplified block diagram illustrating messages enabling an SMF and UPF to communicate through a 1:1 static NAT service, according to an example embodiment.

Referring now to FIG. 2, messages within a 5G system 200, as well as messages between the system 200 and a Domain Name Service (DNS) server 205 are shown. In FIG. 2, the SMFs 150 and 152 are grouped together into an SMF set 210, which may be associated with a single FQDN (e.g., n4.smf.cld) that can each handle the same data session. Additionally, the UPF 160 and UPF 162 are associated with individual FQDNs, e.g., n4.upf.nw and n4.upf2.nw, respectively. In the method shown in FIG. 2, the SMF 152 is communicating with the UPF 162 to set up a user plane data session using the FQDN of both the UPF 162 (e.g., n4.upf2.nw) and the SMF 152 (e.g., n4.smf.cld).

The SMF set 210 registers the FQDN (e.g., n4.smf.cld) of the SMF set 210 with a registration message 220 to the DNS server 205. Registering the FQDN of the SMF set 210 with the DNS server 205 ensures that the IP address of the individual SMF 152 is not relevant, since the UPF 162 will resolve the FQDN of the SMF set 210 to the correct IP address through the DNS server 205. The UPF 162 sends a message 230 to the DNS server 205 and registers the publicly available IP address of the UPF 162 that gets through the NAT service 145.

The UPF 162 also sends a registration message 240 and registers the FQDN (e.g., n4.upf2.nw) in the NRF 180 for UPF discovery, so that the actual IP address of the UPF 162 can change as networks adapt. The DNS server 205 may be updated (e.g., with another message 230) as the UPF 162 uses Dynamic Host Configuration Protocol (DHCP) to get an N4 IP address.

To initiate an N4 association with the UPF 162, the SMF 152 discovers the FQDN of the UPF 162 from the NRF 180 and resolves the FQDN of the UPF 162 in an exchange 250 with the DNS server 205. For a UPF-initiated N4 association, the UPF 162 may resolve the FQDN of the SMF set 210 to the IP address of either SMF 150 (e.g., 10.1.0.1) or the SMF 152 (e.g., 10.1.0.2) in an exchange 260. Additionally, the UPF 162 may learn the IP address of the SMF 152 in the SMF 152 and determine if there are other SMF n4 instances (e.g., SMF 150) that may be used for load balancing, redundancy, or resiliency.

In one example, using the FQDN in NRF registration may be part of 5G Release-15, while the use of SMF sets and/or UPF sets may be part of 5G Release-16. However, SMF/UPF sets are not required for the techniques described herein. Regardless of using the SMF set 210 or a comparable UPF set, if there are multiple SMF and UPF instances on both sides, the techniques described with respect to FIG. 2 assume a 1:1 static NAT service 145. If there are N SMFs, there are N external IP addresses required for the SMFs on the region cloud 110. If there are M UPFs, then there are M external IP addresses required for the UPFs on the remote cloud 120 (e.g., the enterprise premise site).

In another example, messages in PFCP protocol (i.e., Technical Specification (TS) 29.244) are modified to include the IP address as part of F-SEID. The modified messages include:

PFCP Session Establishment Request

| | | |
|---|---|---|
| CP F-SEID | M | This IE shall contain the unique identifier allocated by the CP function identifying the session. |

PFCP Session Establishment Response

| | | |
|---|---|---|
| UP F-SEID | C | This IE shall be present if the cause is set to "Request accepted (success)". When present, it shall contain the unique identifier allocated by the UP function identifying the session. |

PFCP Session Modification Request

| | | |
|---|---|---|
| CP F-SEID | C | This IE shall be present if the CP function decides to change its F-SEID for the PFCP session. The UP function shall use the new CP F-SEID for subsequent PFCP Session related messages for this PFCP Session. |

Figure 3:
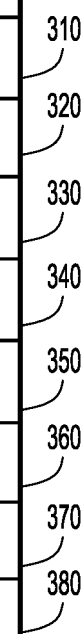
FIG. 3 illustrates an F-SEID enabling communication between the SMF and UPF through a 1:1 static NAT service, according to an example embodiment.

Referring now to FIG. 3, an example of a modified F-SEID Information Element (IE) 300 is shown. The IE 300 includes a type field 310 in the first two octets with a value of 57 identifying the IE 300 as an F-SEID. The third and fourth octet of the IE 300 identifies the length 320 (e.g., n) of the IE 300. The fifth octet of the IE 300 signals the presence of addresses in the remainder of the IE 300. The first bit 330 of the fifth octet indicates that an IPv6 address is present in the IE 300. The second bit 331 of the fifth octet indicates that an IPv4 address is present in the IE 300. The third bit 332 of the fifth octet, which is currently reserved for a future implementation, is modified to indicate that the FQDN of the SMF is present in the IE 300. In another example, any of the remaining bits of the fifth octet in the IE 300, which are spare bits reserved for future implementations may be used to indicate that the FQDN of the SMF is present in the IE 300. The value of the Session Endpoint Identifier (SEID) is included in eight octets of the IE 300 as SEID field 340.

If the bit 331 indicates that an IPv4 address is present, then the IPv4 address 350 is included in four octets (e.g., octets m through m+3). If the bit 330 indicates that an IPv6 address is present, then the IPv6 address 360 is included in sixteen octets (e.g., octets p though p+15). If the bit 332 indicates that an FQDN is present, then the FQDN field 370 is included using sufficient octets to encode the FQDN field 370. Additional fields 380 may be included in the IE 300 if they are explicitly specified.

Typically, the F-SEID IE 300 does not include an FQDN. However, to enable the SMF 152 and UPF 162 to communicate across work across NATs, the FQDN field 370 is added to the F-SEID IE 300 as shown in FIG. 3. Providing the FQDN field 370 in the F-SEID IE 300, enables the SMF 152 to find the current IP address of the UPF 162 in the event of changes in IP address of the UPF 162. The FQDN field 370 may be included as an option to the F-SEID IE 300.

Method-2: Use of Non-Standard Port for PFCP and GTP-U

For a network deployment with a single, static, outward-facing IP address in the NAT and multiple SMFs and/or UPFs with multiple internal IP addresses, communicating across the NAT service using the standard UDP ports for PFCP and GTP-U messages (i.e., PFCP-C: port 8805 and GTP-U (PFCP-U): port 2152) would cause each SMF/UPF to send indistinguishable messages once the individual internal IP addresses are translated to the single outward-facing IP address. The techniques described with respect to FIG. 4 use non-standard ports for PFCP-C and GTP-U on the additional SMFs and UPFs and have these non-standard ports stored as a configuration in the NRF.

Figure 4:
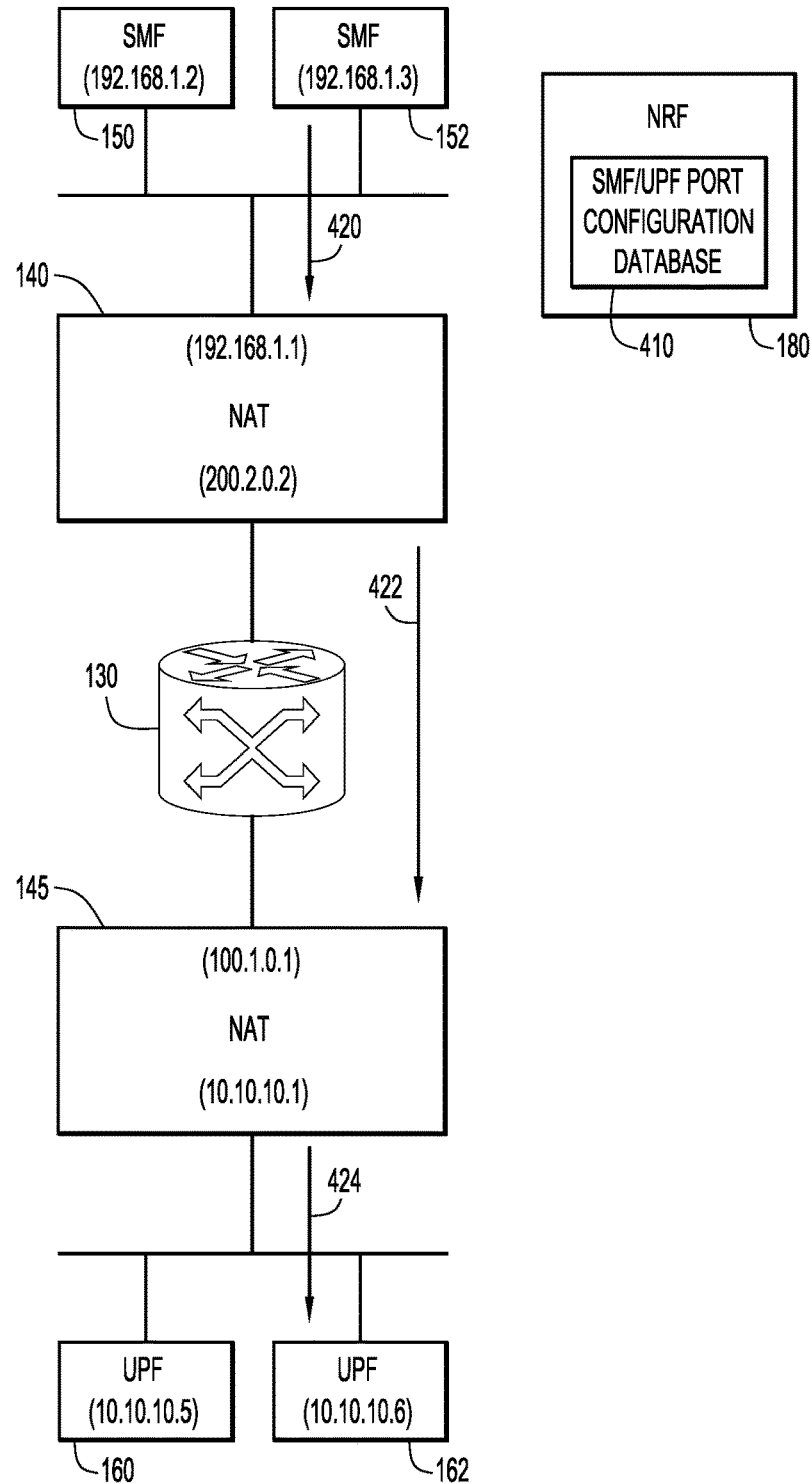
FIG. 4 is a simplified block diagram of 5G system using alternate ports to enable SMFs and UPF to communicate through NAT services, according to an example embodiment.

Referring now to FIG. 4, a deployment 400 of the 5G system 100 includes the SMF 150 and the SMF 152 behind a the NAT service 140 with a single outside IP address (e.g., 200.2.0.2). Messages from the SMF 150 and the SMF 152 with their individual IP addresses (e.g., 192.168.1.2 and 192.168.1.3, respectively) are routed to the inside address of the NAT service 140 (e.g., 192.168.1.1). The NAT service 140 receives messages from the individual IP address of the SMF 150 and the SMF 152 (e.g., 192.168.1.2 and 192.168.1.3) and sends the messages with the outside IP address of the NAT service 140 (e.g., 200.2.0.2) to the network 130.

Similarly, the deployment 400 includes the UPF 160 and the UPF 162 behind the NAT service 145 with a single outside IP address (e.g., 100.1.0.1). Messages from the UPF 160 and the UPF 162 with their individual IP addresses (e.g., 10.10.10.5 and 10.10.10.6, respectively) are routed to the inside address of the NAT service 145 (e.g., 10.10.10.1). The NAT service 145 receives messages from the individual IP address of the UPF 160 and the UPF 162 (e.g., 10.10.10.5 and 10.10.10.6) and sends the messages with the outside IP address of the NAT service 145 (e.g., 100.1.0.1) to the network 130.

To ensure that each SMF instance can select and communicate with the appropriate UPF instance through the NAT services 140 and 145, the SMF 150, SMF 152, UPF 160, and UPF 162 are assigned a specific port numbers, which the NAT services 140 and 145 recognize and forward to the appropriate SMF/UPF. The specific alternate port assignments are stored in an SMF/UPF port configuration database 410 in the NRF 180. The SMF 150 and the SMF 152 may retrieve the alternate port information from the NRF 180 to determine which port to use when communicating with a remote UPF (e.g., UPF 160 or UPF 162). Alternatively, for instance, in a 4G system, each SMF and UPF (i.e., SGW-C/PGW-C and SGW-U/PGW-U) may be individually configured with the alternate port assignments rather than retrieving the information from the NRF 180.

In one example, the alternate port assignments may include standard port settings as well as non-standard settings. For instance, the SMF 150 may be assigned to the standard port settings (i.e., PFCP port 8805 or GTP-U port 2152), while the SMF 152 may be assigned to non-standard settings (e.g., PFCP port 8806 or GTP-U port 2153). Similarly, the UPF 160 may be assigned to standard port settings (i.e., PFCP port 8805 or GTP-U port 2152), while the UPF 162 may be assigned to non-standard settings (e.g., PFCP port 8806 or GTP-U port 2153).

In another example, when the SMF 152 initiates a data session with the UPF 162, the SMF 152 retrieves the alternate port assignment for the UPF 162 (e.g., PFCP 8806) from the NRF 180. The SMF 152 sends an association request 420 to the outside IP address of the NAT service 145 (e.g., 100.1.0.1) on the assigned port for the UPF 162 (e.g., UDP port 8806) from the IP address of the SMF 152 (e.g., 192.168.1.3). The NAT service 140 intercepts the association request 420 and sends an association request 422 from the outside IP address of the NAT service (e.g., 200.2.0.2) on the port assigned to the UPF 162 (e.g., UDP 8806). The NAT service 145 on the enterprise side of the network 130 correlates the port (e.g., UDP port 8806) on which it received the association request 422 with the UPF 162 and forwards the association request 424 to the IP address of the UPF 162 (e.g., 10.10.10.6).

Each SMF may be configured to communicate with UPFs behind the NAT service 145 with a configuration such as:
UPF1 PFCP port 8805, GTP-U: 2152
UPF2 PFCP port 8806, GTP-U: 2153
UPF3 PFCP port 8807, GTP-U: 2154

Similarly, each UPF may be configured to communicate with SMFs behind the NAT service 140 with a configuration such as:
SMF1 PFCP port 8805, GTP-U: 2152
SMF2 PFCP port 8806, GTP-U: 2153
SMF3 PFCP port 8807, GTP-U: 2154

The NAT service 140 may be configured to pass the alternate port assignments with a configuration such as:
ip nat inside source static udp 192.168.1.2 8805 200.2.0.2 8805
ip nat inside source static udp 192.168.1.2 2152 200.2.0.2 2152
ip nat inside source static udp 192.168.1.3 8806 200.2.0.2 8806
ip nat inside source static udp 192.168.1.3 2153 200.2.0.2 2153
ip nat inside source static udp 192.168.1.4 8807 200.2.0.2 8807 ip nat inside source static udp 192.168.1.4 2154 200.2.0.2 2154
access-list 1 permit 192.169.1.0 0.0.0.255
ip nat inside source-list 1 interface g0/0 overload Similarly, the NAT service 145 may be configured to pass the alternate port assignments with a configuration such as:
ip nat inside source static udp 10.10.10.5 8805 100.1.0.1 8805
ip nat inside source static udp 10.10.10.5 2152 100.1.0.1 2152
ip nat inside source static udp 10.10.10.6 8806 100.1.0.1 8806
ip nat inside source static udp 10.10.10.6 2153 100.1.0.1 2153
ip nat inside source static udp 10.10.10.7 8807 100.1.0.1 8807
ip nat inside source static udp 10.10.10.7 2154 100.1.0.1 2154
access-list 10 permit 10.10.10.0 0.0.0.255
ip nat inside source-list 1 interface g0/0 overload One example of a UPF configuration stored in the NRF 180 is:

```
UpfInfo:
  type: object
  required:
    - sNssaiUpfInfoList
  properties:
    sNssaiUpfInfoList:
      type: array
      items:
        $ref: '#/components/schemas/SnssaiUpfInfoItem'
      minItems: 1
    smfServingArea:
      type: array
      items:
        type: string
      minItems: 1
    interfaceUpfInfoList:
      type: array
      items:
        $ref: '#/components/schemas/InterfaceUpfInfoItem'
      minItems: 1
    iwkEpsInd:
      type: boolean
      default: false
    pduSessionTypes:
      type: array
      items:
        $ref:
'TS29571_CommonData.yaml/components/schemas/PduSessionType'
      minItems: 1
    altPfcpCPort:
      type: integer
      minimum: 0
      maximum: 65535
    altPfcpUPort:
      type: integer
      minimum: 0
      maximum: 65535
```

A similar configuration may stored in the NRF 180 for the SMF configuration. Additionally, the NAT service 140 and 145 are configured to perform the appropriate port forwarding for the non-standard ports.

Method-3: Use of Proxy and ALG

In some implementations of a NAT service (e.g., NAT service 140 or 145), a provider may augment the NAT service with an ALG to assist in traversing the NAT service. The techniques described with respect to FIG. 5 are one example of using the ALG interface to provide proxy functions for unencrypted N4 associations, with which the deployed SMF or UPF instances may interact without having to address the NAT service.

Figure 5:
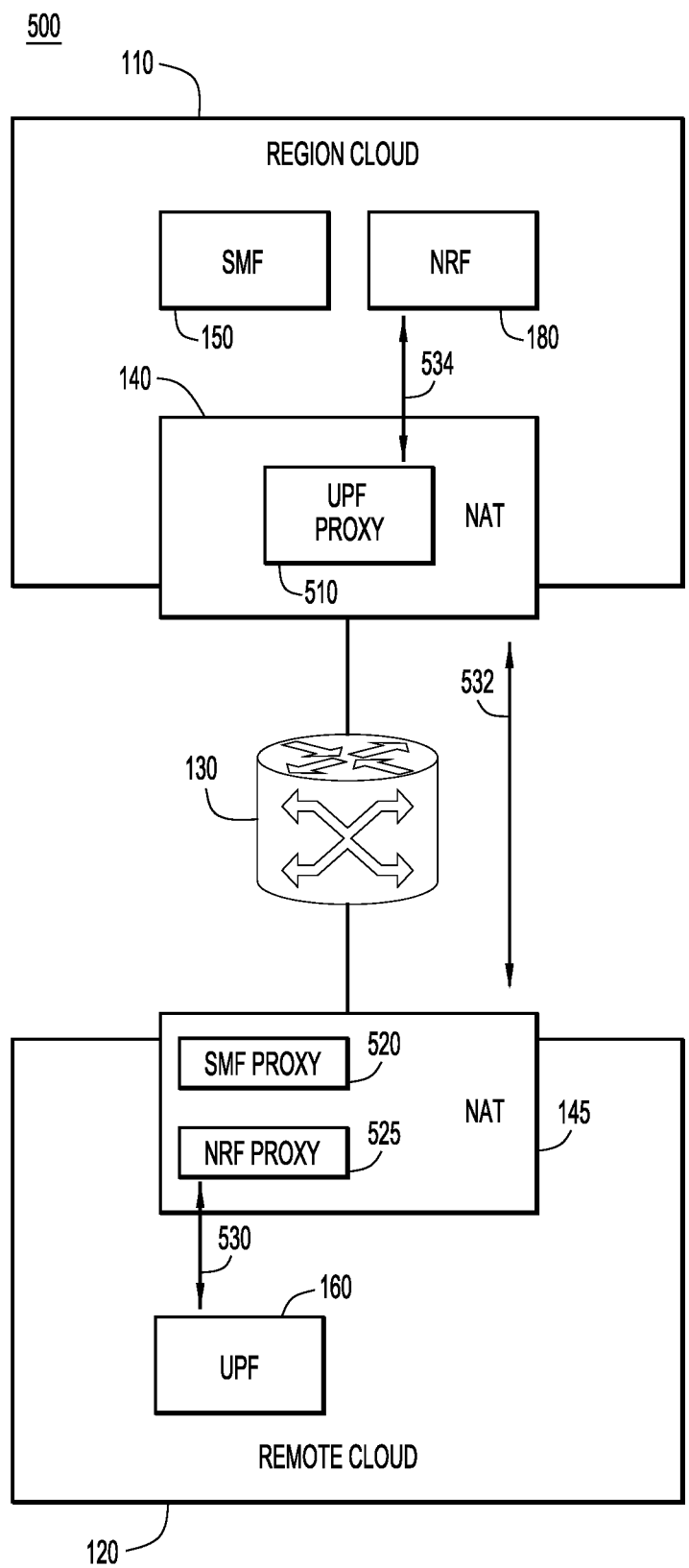
FIG. 5 is a simplified block diagram of a 5G system using an Application Level Gateway (ALG) to enable an SMF and a UPF to communicate through a NAT service, according to an example embodiment.

Referring now to FIG. 5, a deployment 500 of the 5G system 100 includes the NAT services 140 and 145 using ALG interfaces to enable the SMF 150, UPF 160, and NRF 180 to traverse the NAT services 140 and 145. The NAT service 140 generates a UPF proxy 510 to communicate with the SMF 150 and the NRF 180. Similarly, the NAT service 145 generates an SMF proxy 520 and an NRF proxy 525 to communicate with the UPF 160.

The UPF 160 communicates in an exchange 530 with the NRF proxy 525, for instance, to retrieve configuration information. The NRF proxy 525 translates the exchange 530 into an exchange 532 with the UPF proxy 510. The UPF proxy 510 translates the exchange 532 with the NRF proxy 525 into an exchange 534 with the NRF 180 in the region cloud 110. The NAT traversal ALG augments the NAT services 140 and 145 to enable the translation of the exchanges 530, 532, and 534.

In one example, the NAT traversal ALG behaves as the SMF proxy 520 to the UPF 160 to avoid directly dealing with the NAT service 140. Alternatively, the UPF 160 may trigger an N4 association with the SMF proxy 520, which allows the SMF 150 to initiate the N4 association to the UPF proxy 510.

Additionally, the NAT traversal ALG may discover the NAT presence and advertise the NAT presence to the SMF 150 and/or the NRF 180, as necessary. The NAT traversal ALG may provide security between the UPF 160 on the remote cloud 120 and the SMF 150 on the region cloud 110.

With the NAT service 140 in the region cloud 110, the UPF proxy 510 performs the N4 ALG functions so that IP addresses and NAT bindings are maintained. For instance, the NAT traversal ALG may maintain NAT bindings through NAT keep-alive or N4 heartbeat messages.

In another example, the NAT traversal ALG may translate the F-SEID to match the IUP addresses of the N4 endpoints (i.e., the SMF 150 and the UPF 160). The NAT traversal ALG may insert the GTP-U IP address in the bearer path setup.

In a further example, the NAT traversal ALG may serve as the NRF proxy 525 for the UPF 160 through NRF hierarchy discovery. The UPF proxy 510 and ALG coordinate with the NRF proxy 525, the cloud management API(s), and the UPF 160 so that any UPF in the remote cloud 120 is made discoverable and manageable by the SMF 150. By combining the NRF proxy 525 and the UPF proxy 510, the detection and selection can be unified with the cloud management API's so that the root NRF 180 can discover the UPF 160 on behalf of the SMF 150.

Furthermore, the NRF proxy 525 may trigger the UPF 160 to initiate an N4 association if the (remote cloud) NAT service 145 does not permit incoming connections from external sources.

Figure 6:
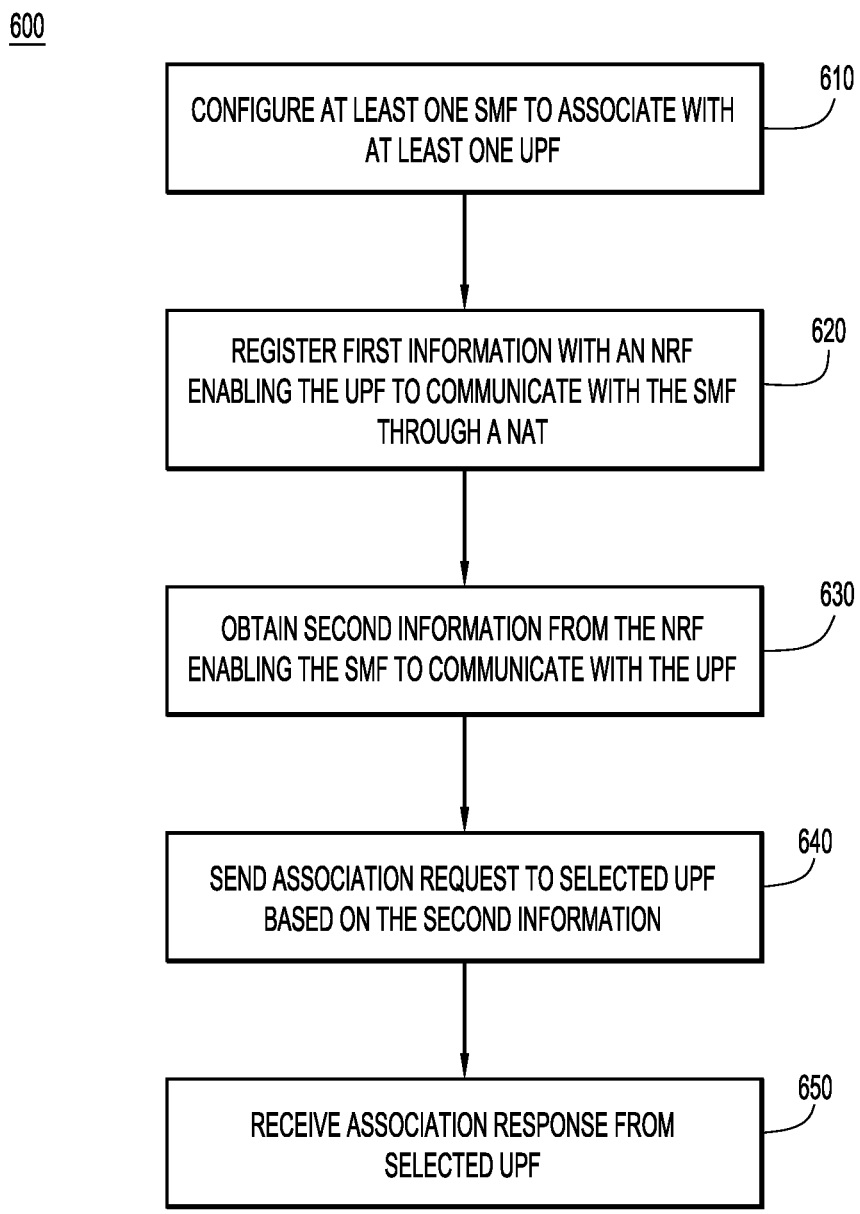
FIG. 6 is a flowchart illustrating operations performed at an SMF to traverse a NAT service between the SMF and a UPF, according to an example embodiment.

Referring now to FIG. 6, a flowchart illustrates operations performed by an SMF (e.g., SMF 150) in a process 600 for creating an association (e.g., an N4 association) with a UPF (e.g., UPF 160) across a NAT service (e.g., NAT service 145). At 610, the SMF is configured to initiate an association with at least one remote UPF. At 620, the SMF registers first information with an NRF enabling the remote UPF to communicate with the SMF through at least one NAT service. In one example, the first information may include an FQDN of the SMF or alternate port information of the SMF.

At 630, the SMF obtains second information from the NRF enabling the SMF to communicate with the remote UPF. In one example, the second information may include the FQDN of the UPF or alternate port information of the UPF. At 640, the SMF sends an association request to a selected remote UPF based on the second information. In one example, the SMF may obtain the FQDN of the selected UPF as the second information and resolve the FQDN to determine the outside IP address that a NAT service is presenting for the remote UPF. In another example, the SMF may obtain an alternate port assigned to the selected UPF and send the association request using the alternate port assigned to the selected UPF, which will be recognized by the NAT service associated with the selected UPF. At 650, the SMF receives an association response from the selected UPF confirming the association between the SMF and the selected UPF. In one example, the association is an N4 association.

Figure 7:
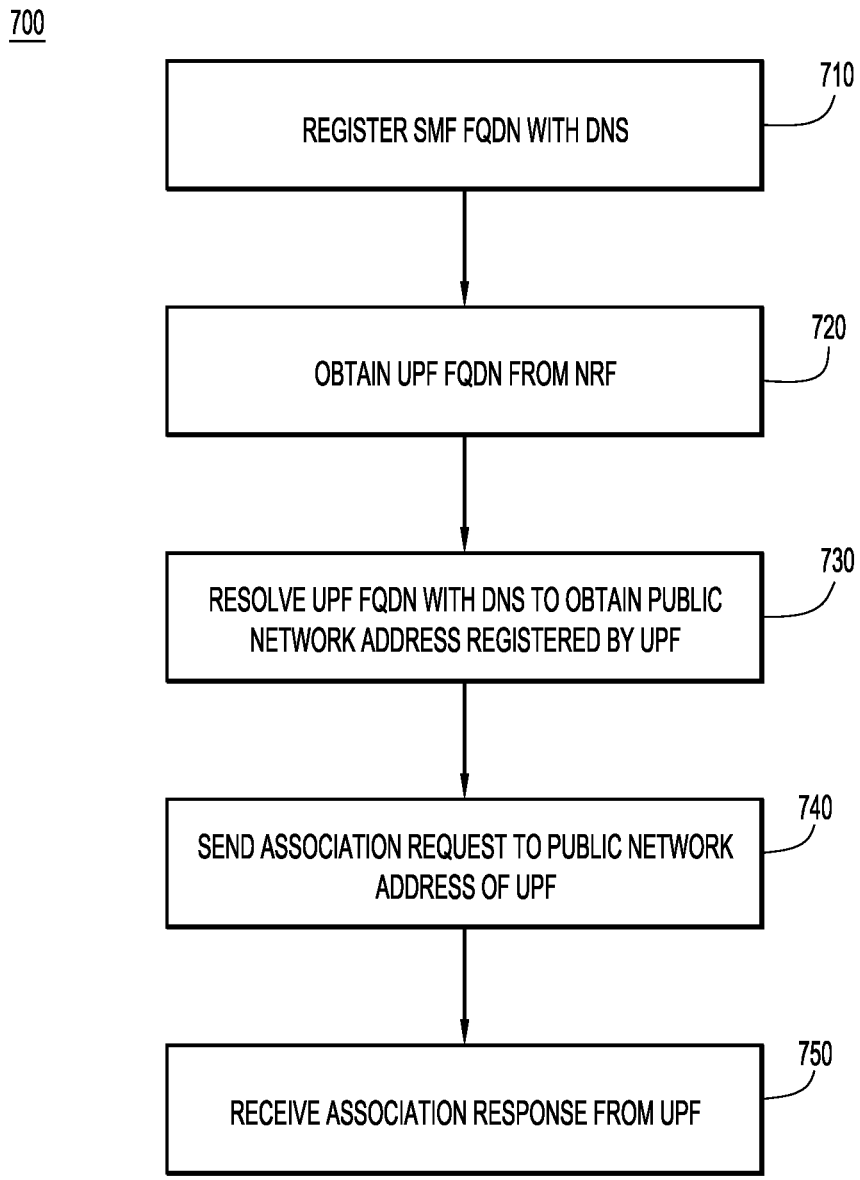
FIG. 7 is a flowchart illustrating operations performed at an SMF to traverse a NAT service by including an FQDN in the F-SEID when communicating with a UPF, according to an example embodiment.

Referring now to FIG. 7, a flowchart illustrates operations performed by an SMF in a process 700 for creating an association (e.g., an N4 association) with a UPF (e.g., UPF 160) across a NAT service (e.g., NAT service 145). At 710, the SMF registers the FQDN of the SMF with a DNS server. In one example, the SMF may register an FQDN associated with an SMF set comprising a plurality of SMFs. At 720, the SMF obtains the FQDN of a remote UPF from an NRF of the 5G system. In one example, the FQDN of the remote UPF may be included in an F-SEID IE.

At 730, the SMF resolves the FQDN of the UPF with the DNS server to obtain the public network address registered by the UPF. In one example, the public network address may be an outside IP address of a NAT service associated with the remote UPF. At 740, the SMF sends an association request to the public network address of the remote UPF. At 750, the SMF receives an association response from the UPF to confirm the association between the SMF and the UPF.

Figure 8:
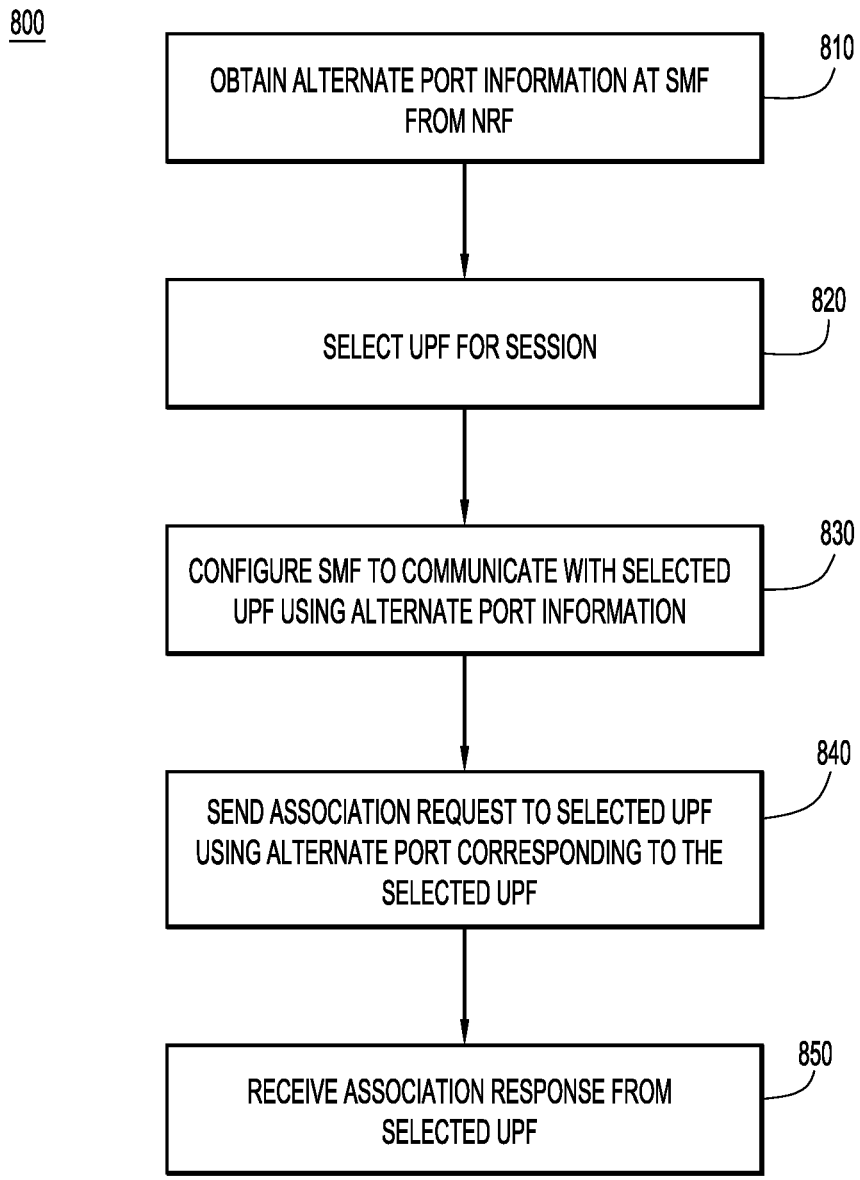
FIG. 8 is a flowchart illustrating operations performed at an SMF to communicate with a UPF using alternate ports to traverse a NAT service, according to an example embodiment.

Referring now to FIG. 8, a flowchart illustrates operations performed by an SMF in a process 800 for creating an association (e.g., an N4 association) with a UPF (e.g., UPF 160) across a NAT service (e.g., NAT service 145). At 810, the SMF obtains alternate port information associated with at least one remote UPF from an NRF of the 5G system. In one example, the alternate port information may include a listing of alternate PFCP and GTP-U ports assigned to each UPF at an enterprise site.

At 820, the SMF selects a UPF for a user data session and determines the alternate port for the selected UPF. At 830, the SMF is configured to communicate with the selected UPF using the alternate port information. At 840, the SMF sends an association request to the selected UPF using the alternate port information associated with the selected UPF. In one example, the alternate port information enables a NAT service at an enterprise site to correlate the alternate port of the association request with the selected UPF. At 850, the SMF receives an association response from the UPF to confirm the association between the SMF and the UPF. In one example, the association response is received on an alternate port assigned to the SMF, which a NAT service associated with the SMF correlates to the SMF.

Figure 9:
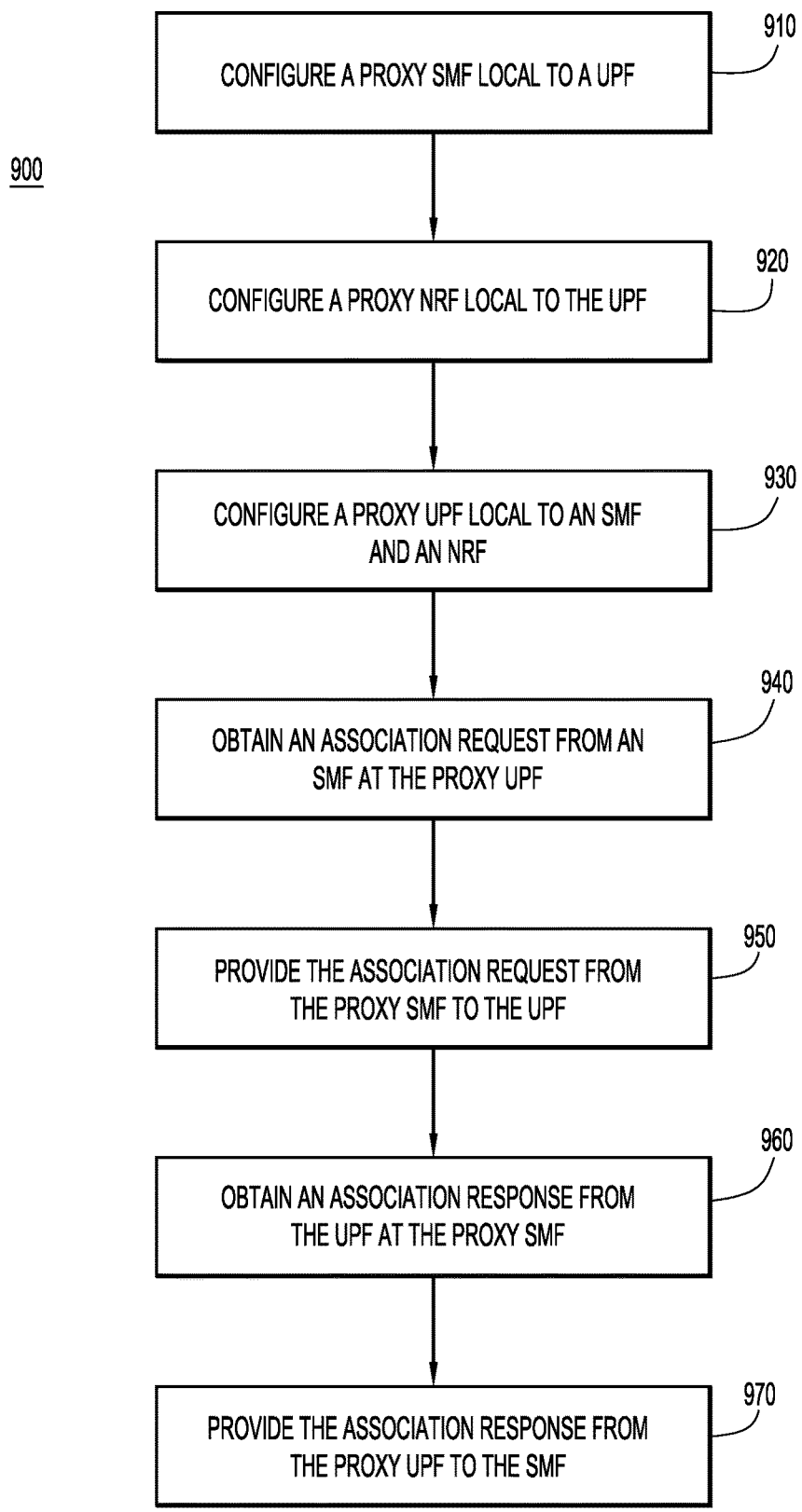
FIG. 9 is a flowchart illustrating operations performed by an ALG to enable an SMF and a UPF to communicate through a NAT service, according to an example embodiment.

Referring now to FIG. 9, a flowchart illustrates operations performed by an Application Level Gateway (ALG) in a process 900 to facilitate an association (e.g., an N4 association) between an SMF and a UPF across a NAT service. At 910, the ALG configures a proxy SMF that is local the UPF. At 920, the ALG configures a proxy NRF local to the UPF. In one example, the UPF communicates with the proxy SMF and the proxy NRF to traverse the NAT service associated with the SMF. At 930, the ALG configures a proxy UPF local to the SMF and the NRF. In one example, the SMF and the NRF communicate with the proxy UPF to traverse a NAT service associated with the UPF.

At 940, the ALG obtains an association request at the proxy UPF from the SMF. At 950, the ALG provides the association request to the UPF from the proxy SMF. In one example, the ALG modifies a network address in the association request to maintain a NAT service between the SMF and the UPF.

At 960, the ALG obtains an association response from the UPF at the proxy SMF. At 970, the ALG provides the association response to the SMF from the proxy UPF to confirm the association between the SMF and the UPF. In one example, the ALG maintains the NAT binding for a NAT service between the SMF and the UPF by modifying a network address in the association response.

Figure 10:
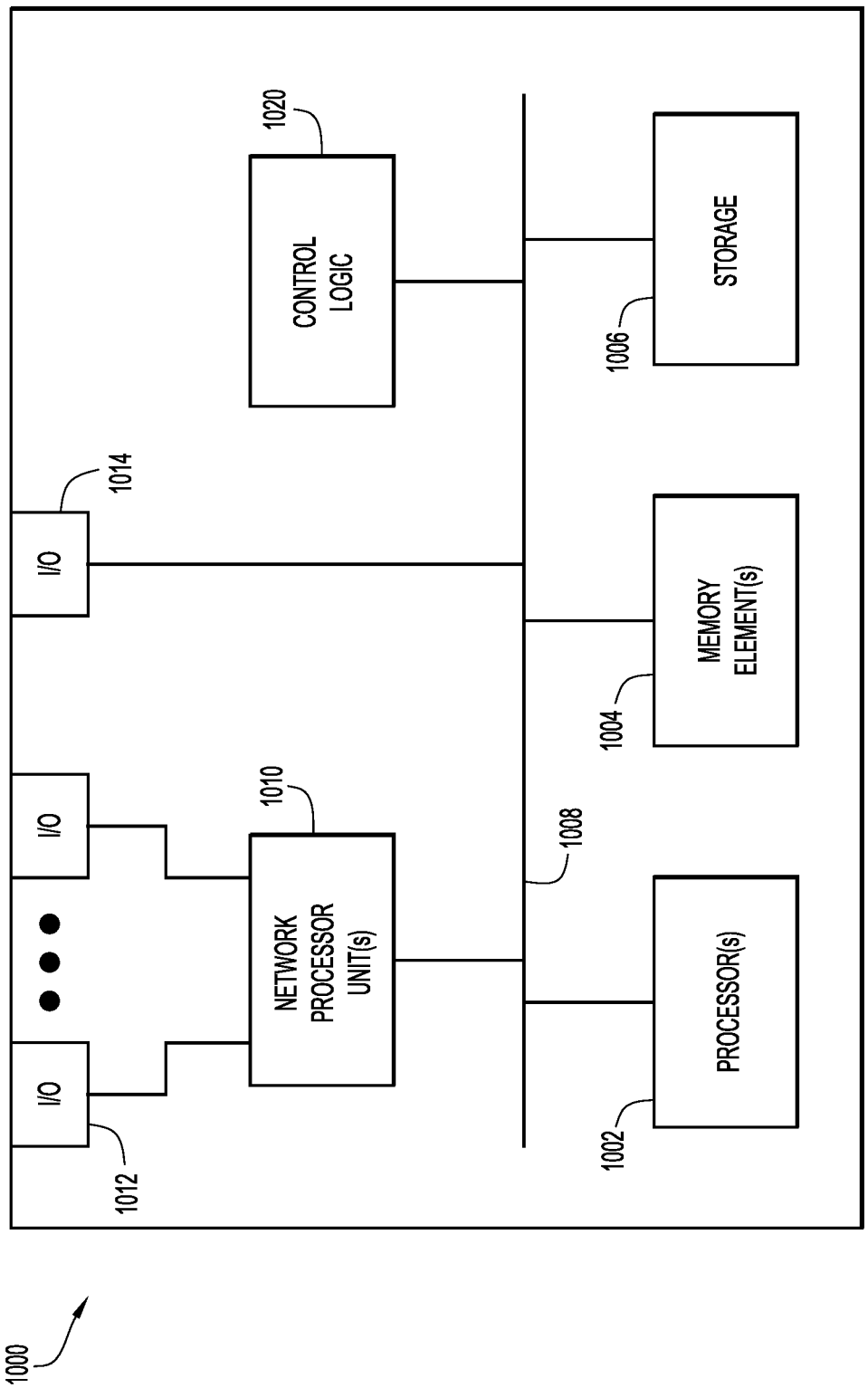
FIG. 10 illustrates a simplified block diagram of a device that may be configured to perform the methods presented herein, according to an example embodiment.

Referring to FIG. 10, FIG. 10 illustrates a hardware block diagram of a computing device 1000 that may perform functions associated with operations discussed herein in connection with the techniques depicted in FIGS. 1-9. In various embodiments, a computing device, such as computing device 1000 or any combination of computing devices 1000, may be configured as any entity/entities as discussed for the techniques depicted in connection with FIGS. 1-9 in order to perform operations of the various techniques discussed herein.

In at least one embodiment, the computing device 1000 may include one or more processor(s) 1002, one or more memory element(s) 1004, storage 1006, a bus 1008, one or more network processor unit(s) 1010 interconnected with one or more network input/output (I/O) interface(s) 1012, one or more I/O interface(s) 1014, and control logic 1020. In various embodiments, instructions associated with logic for computing device 1000 can overlap in any manner and are not limited to the specific allocation of instructions and/or operations described herein.

In at least one embodiment, processor(s) 1002 is/are at least one hardware processor configured to execute various tasks, operations and/or functions for computing device 1000 as described herein according to software and/or instructions configured for computing device 1000. Processor(s) 1002 (e.g., a hardware processor) can execute any type of instructions associated with data to achieve the operations detailed herein. In one example, processor(s) 1002 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1004 and/or storage 1006 is/are configured to store data, information, software, and/or instructions associated with computing device 1000, and/or logic configured for memory element(s) 1004 and/or storage 1006. For example, any logic described herein (e.g., control logic 1020) can, in various embodiments, be stored for computing device 1000 using any combination of memory element(s) 1004 and/or storage 1006. Note that in some embodiments, storage 1006 can be consolidated with memory element(s) 1004 (or vice versa), or can overlap/exist in any other suitable manner.

In at least one embodiment, bus 1008 can be configured as an interface that enables one or more elements of computing device 1000 to communicate in order to exchange information and/or data. Bus 1008 can be implemented with any architecture designed for passing control, data and/or information between processors, memory elements/storage, peripheral devices, and/or any other hardware and/or software components that may be configured for computing device 1000. In at least one embodiment, bus 1008 may be implemented as a fast kernel-hosted interconnect, potentially using shared memory between processes (e.g., logic), which can enable efficient communication paths between the processes.

In various embodiments, network processor unit(s) 1010 may enable communication between computing device 1000 and other systems, entities, etc., via network I/O interface(s) 1012 to facilitate operations discussed for various embodiments described herein. In various embodiments, network processor unit(s) 1010 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1000 and other systems, entities, etc. to facilitate operations for various embodiments described herein. In various embodiments, network I/O interface(s) 1012 can be configured as one or more Ethernet port(s), Fibre Channel ports, and/or any other I/O port(s) now known or hereafter developed. Thus, the network processor unit(s) 1010 and/or network I/O interface(s) 1012 may include suitable interfaces for receiving, transmitting, and/or otherwise communicating data and/or information in a network environment.

I/O interface(s) 1014 allow for input and output of data and/or information with other entities that may be connected to computer device 1000. For example, I/O interface(s) 1014 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1020 can include instructions that, when executed, cause processor(s) 1002 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1020) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1004 and/or storage 1006 can store data, software, code, instructions (e.g., processor instructions), logic, parameters, combinations thereof, and/or the like used for operations described herein. This includes memory element(s) 1004 and/or storage 1006 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, the techniques presented herein enable the ability to have one or more SMF instances in the cloud while one or more UPF instances are deployed on premise or in an enterprise cloud site.

In one form, a method is provided to traverse a NAT service between SMF and UPF instances. The method includes configuring at least one SMF to initiate an association with at least one remote UPF. The method also includes registering first information with an NRF enabling the at least one remote UPF to communicate with the at least one SMF through at least one NAT service. The method further includes obtaining second information from the NRF enabling the at least one SMF to communicate with the at least one remote UPF through the at least one NAT service.

The method also includes sending an association request to a selected remote UPF among the at least one remote UPF based on the second information and receiving an association response from the selected remote UPF.

In another form, an apparatus comprising a network interface and a processor is provided. The network interface is configured to communicate with a plurality of computing devices. The processor is coupled to the network interface and the memory, and configured to configure at least one SMF to initiate an association with at least one remote UPF. The processor is also configured to register first information with an NRF enabling the at least one remote UPF to communicate with the at least one SMF through at least one NAT service. The processor is further configured to obtain second information from the NRF enabling the at least one SMF to communicate with the at least one remote UPF through the at least one NAT service. The processor is also configured to cause the network interface to send an association request to a selected remote UPF among the at least one remote UPF based on the second information. The processor is configured to receive an association response from the selected remote UPF via the network interface.

In still another form, a non-transitory computer readable storage media is provided that is encoded with instructions that, when executed by a processor of a computing device, cause the processor to configure at least one SMF to initiate an association with at least one remote UPF. The instructions also cause the processor to register first information with an NRF enabling the at least one remote UPF to communicate with the at least one SMF through at least one NAT service. The instructions further cause the processor to obtain second information enabling the at least one SMF to communicate with the at least one remote UPF through the at least one NAT service. The instructions also cause the processor to receive an association response from the selected remote UPF.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    configuring a Network Address Translation (NAT) service with an Application Level Gateway (ALG) to connect a first location with a User Plane Function (UPF) and a second location with a Session Management Function (SMF);
    configuring a proxy SMF at the first location;
    obtaining an association request from the SMF, the association request including an SMF network address;
    modifying the SMF network address in the association request to a proxy SMF network address according to a NAT binding;
    providing a modified association request with the proxy SMF network address to the UPF;
    obtaining an association response from the UPF, the association response including the proxy SMF network address; and
    providing the association response to the SMF based on the NAT binding associating the proxy SMF network address with the SMF network address.

2. The method of claim 1, further comprising:
    configuring a proxy UPF at the second location; and
    translating between a proxy UPF network address and a UPF network address based on the NAT binding, the proxy UPF network address associated with the proxy UPF at the second location and the UPF network address associated with the UPF at the first location.

3. The method of claim 2, further comprising the ALG translating a Fully-qualified Session Endpoint Identifier (F-SEID) to include the SMF network address and the UPF network address.

4. The method of claim 2, wherein the UPF triggers the association request from the SMF by initiating an N4 association between the UPF and the proxy SMF.

5. The method of claim 1, further comprising:
    configuring a proxy NRF at the first location; and
    translating an exchange between the UPF at the first location and an NRF at the second location by traversing the NAT service through the proxy NRF at the first location.

6. The method of claim 1, wherein the NAT service maintains the NAT binding through heartbeat messages that traverse the NAT service between the UPF and the SMF.

7. The method of claim 1, wherein the NAT service maintains the NAT binding through NAT keep-alive messages.

8. An apparatus comprising:
    a network interface configured to communicate with a plurality of computing devices; and
    a processor coupled to the network interface, the processor configured to:
        configure a Network Address Translation (NAT) service with an Application Level Gateway (ALG) to connect a first location with a User Plane Function (UPF) and a second location with a Session Management Function (SMF);
        configure a proxy SMF at the first location;
        obtain an association request from the SMF via the network interface, the association request including an SMF network address;
        modify the SMF network address in the association request to a proxy SMF network address according to a NAT binding;
        cause the network interface to provide a modified association request with the proxy SMF network address to the UPF;
        obtain an association response from the UPF via the network interface, the association response including the proxy SMF network address; and
        cause the network interface to provide the association response to the SMF based on the NAT binding associating the proxy SMF network address with the SMF network address.

9. The apparatus of claim 8, wherein the processor is further configured to:
    configure a proxy UPF at the second location; and
    translate between a proxy UPF network address and a UPF network address based on the NAT binding, the proxy UPF network address associated with the proxy UPF at the second location and the UPF network address associated with the UPF at the first location.

10. The apparatus of claim 9, wherein the processor is further configured to translate a Fully-qualified Session Endpoint Identifier (F-SEID) to include the SMF network address and the UPF network address.

11. The apparatus of claim 8, wherein the processor is further configured to:
configure a proxy NRF at the first location; and
translate an exchange between the UPF at the first location and an NRF at the second location by traversing the NAT service through the proxy NRF at the first location.

12. The apparatus of claim 8, wherein the processor is further configured to maintain the NAT binding through heartbeat messages that traverse the NAT service between the UPF and the SMF.

13. The apparatus of claim 8, wherein the processor is further configured to maintain the NAT binding through NAT keep-alive messages.

14. One or more non-transitory computer readable storage media encoded with software comprising computer executable instructions and when the software is executed operable to cause a processor to:
configure a Network Address Translation (NAT) service with an Application Level Gateway (ALG) to connect a first location with a User Plane Function (UPF) and a second location with a Session Management Function (SMF);
configure a proxy SMF at the first location;
obtain an association request from the SMF, the association request including an SMF network address;
modify the SMF network address in the association request to a proxy SMF network address according to a NAT binding;
provide a modified association request with the proxy SMF network address to the UPF;
obtain an association response from the UPF, the association response including the proxy SMF network address; and
provide the association response to the SMF based on the NAT binding associating the proxy SMF network address with the SMF network address.

15. The one or more non-transitory computer readable storage media of claim 14, wherein the software is further operable to cause the processor to:
configure a proxy UPF at the second location; and
translate between a proxy UPF network address and a UPF network address based on the NAT binding, the proxy UPF network address associated with the proxy UPF at the second location and the UPF network address associated with the UPF at the first location.

16. The one or more non-transitory computer readable storage media of claim 15, wherein the software is further operable to cause the processor to translate a Fully-qualified Session Endpoint Identifier (F-SEID) to include the SMF network address and the UPF network address.

17. The one or more non-transitory computer readable storage media of claim 15, wherein the UPF triggers the association request from the SMF by initiating an N4 association between the UPF and the proxy SMF.

18. The one or more non-transitory computer readable storage media of claim 14, wherein the software is further operable to cause the processor to:
configure a proxy NRF at the first location; and
translate an exchange between the UPF at the first location and an NRF at the second location by traversing the NAT service through the proxy NRF at the first location.

19. The one or more non-transitory computer readable storage media of claim 14, wherein the software is further operable to cause the processor to maintain the NAT binding through heartbeat messages that traverse the NAT service between the UPF and the SMF.

20. The one or more non-transitory computer readable storage media of claim 14, wherein the software is further operable to cause the processor to maintain the NAT binding through NAT keep-alive messages.

\* \* \* \* \*